Oct. 16, 1962   R. D. E. ELDRED ETAL   3,058,152
SOLE MOLDING MACHINES
Filed Dec. 17, 1958   14 Sheets-Sheet 1

*Inventor*
Raymond D. E. Eldred
Stanley E. Frampton
By their Attorney

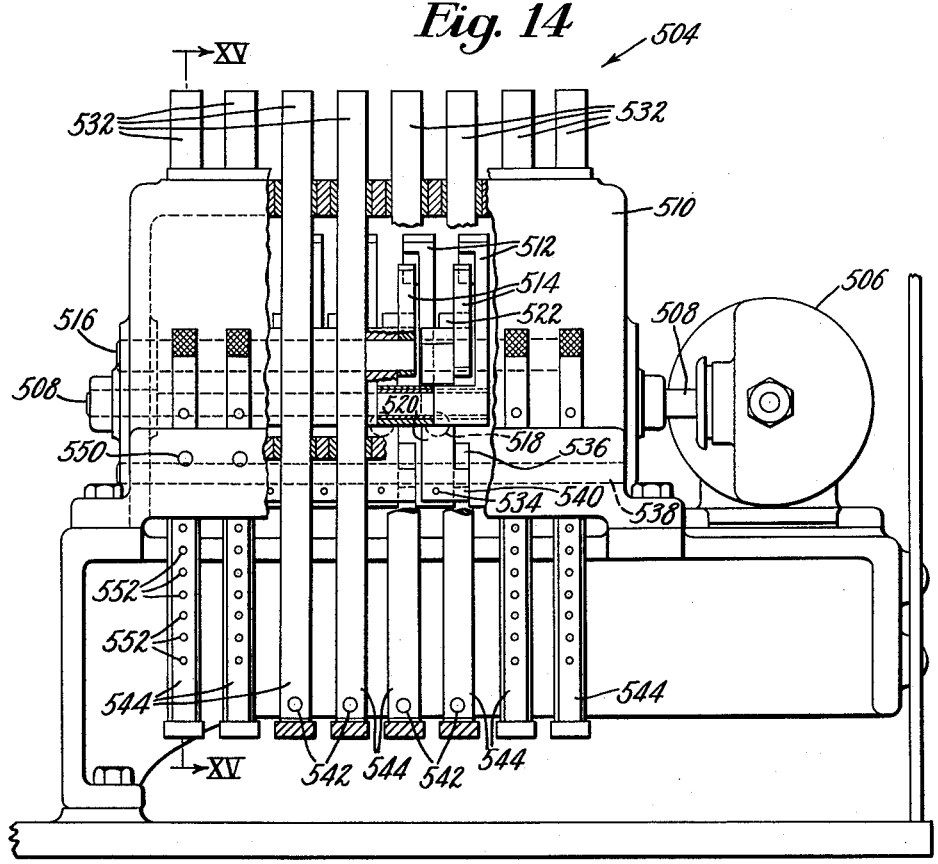
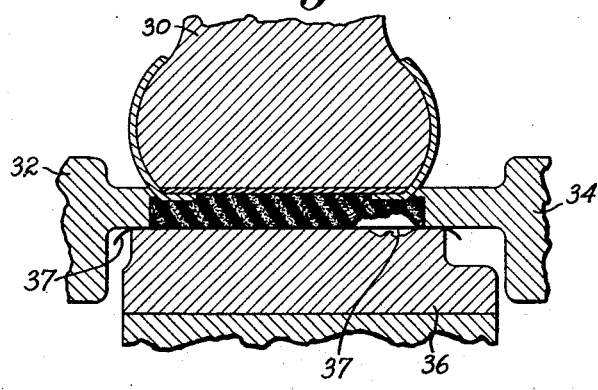

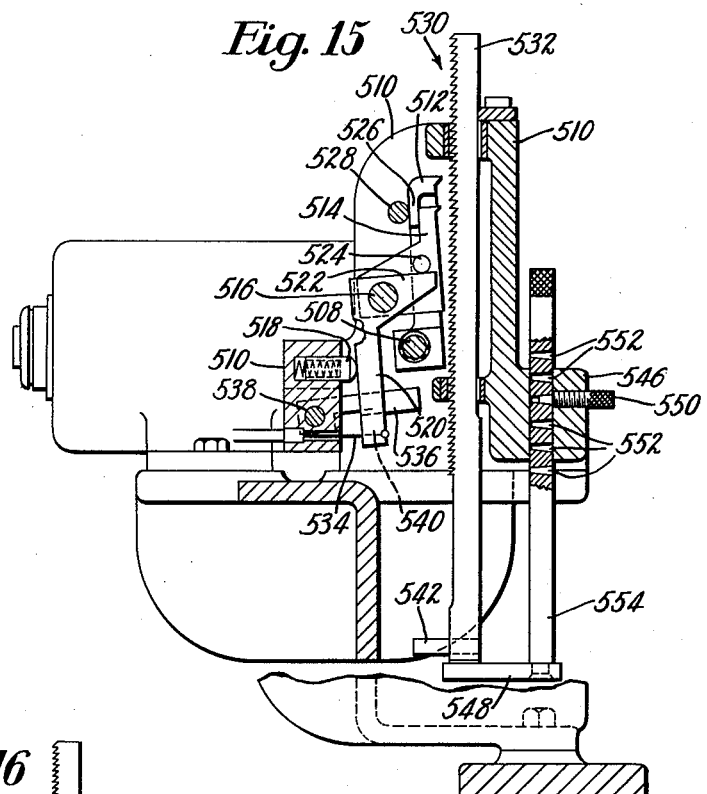
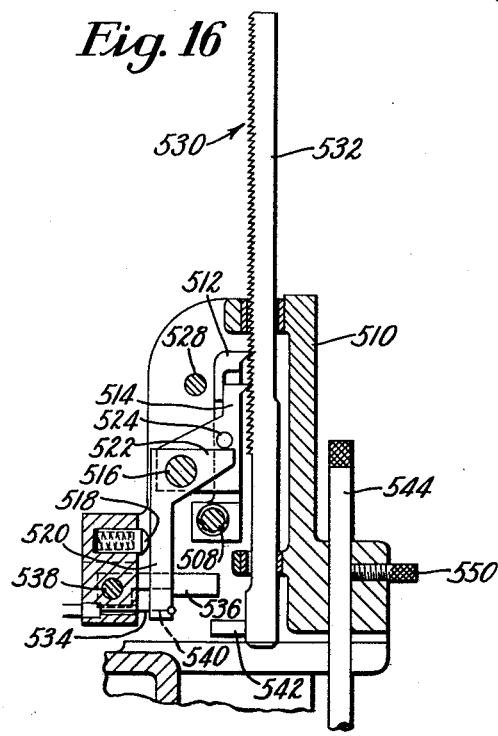

United States Patent Office 3,058,152
Patented Oct. 16, 1962

3,058,152
SOLE MOLDING MACHINES
Raymond Derek Edwin Eldred and Stanley Ernest Frampton, Leicester, England, assignors to United Shoe Machinery Corporation, Flemington, N.J., a corporation of New Jersey
Filed Dec. 17, 1958, Ser. No. 781,138
Claims priority, application Great Britain Jan. 8, 1958
3 Claims. (Cl. 18—17)

This invention relates to molding machines and is herein illustrated in its application to machines for molding and attaching outsoles to shoe bottoms and curing or vulcanizing the outsole substance. A machine of this type is disclosed in United States Letters Patent No. 2,922,191, granted January 26, 1960 on an application filed in the name of George C. Barton. It is to be understood that in certain aspects thereof the invention is not limited to machines which perform both a molding and a curing operation nor to machines constructed and arranged to mold outsoles to shoe bottoms but is applicable to molding machines generally.

In general, it is the object of the present invention to provide a machine of the type disclosed in the Barton Patent above referred to which is characterized by economies in the manufacture of the machine and increased facility in its operation.

It is a further object of the invention to provide a machine of this type which is particularly adapted to the molding onto shoe bottoms of outsoles characterized by a cellular structure. In the molding of such soles onto shoe bottoms the mold elements are fully closed before the curing or vulcanizing operation commences and are held in fixed relation to each other and to the shoe bottom during the period of vulcanization, the expansion of the soling material serving to effect the filling of the mold cavity and the attachment of the sole to the shoe bottom.

With the above and other objects in view, as will hereinafter appear, the present invention in one aspect thereof consists in the provision in a molding machine having side mold members, a bottom mold member and a work support which advances to position the work relatively to the mold elements, of means for terminating the vulcanizing cycle after a predetermined time interval has elapsed. The duration of the vulcanizing cycle is measured by the operation of a rack member which is advanced step-by-step by a continuously reciprocated thrust member. The vulcanizing cycle is terminated by the release of a latch effected by an element carried by the rack member. The release of the latch causes return movement of a lever which thereby effects the initiation of an opening movement of the mold elements and a return movement of the work support to its retracted position. When the machine is at rest a biased lever holds the thrust member out of engagement with the rack member. The advancement of the work support into a mold closing position retracts said biased lever thereby to release the thrust member for operation on the rack member. Such release of the thrust member starts the timing of the vulcanizing cycle.

For operating the side mold members and the bottom mold member, the present invention provides a piston which partially advances the side mold members, then advances the bottom mold member and finally completes the closing of the side mold members concomitantly with the completion of the closing of the bottom mold member. For partially closing the side mold members, the illustrated machine is provided with means including a spacer member for coupling the piston to the side mold members. After the side mold members have been partially advanced, means operated by the piston moves the spacer member into an inoperative position and continued movement of the piston thereafter advances an actuator which imparts mold closing movement to the bottom mold member. During the final stage of its operation the piston actuates a member which completes the advancement of the side mold members into their closed position and retains them against opening movement.

The invention will now be described with reference to the accompanying drawings and pointed out in the appended claims.

In the drawings,

FIG. 14 is a front elevation of a timing unit with which the machine is provided, certain parts being broken away in order to permit the showing of other parts;

FIG. 15 is a section taken on the line XV—XV of FIG. 14;

FIG. 16 is a section taken on the same plane as FIG. 15 but showing the parts at a different stage in the operating cycle;

FIG. 19 is a cross sectional view illustrating a shoe in the molding station at the completion of the vulcanizing cycle, certain parts being broken away to improve the showing.

Figure 5:
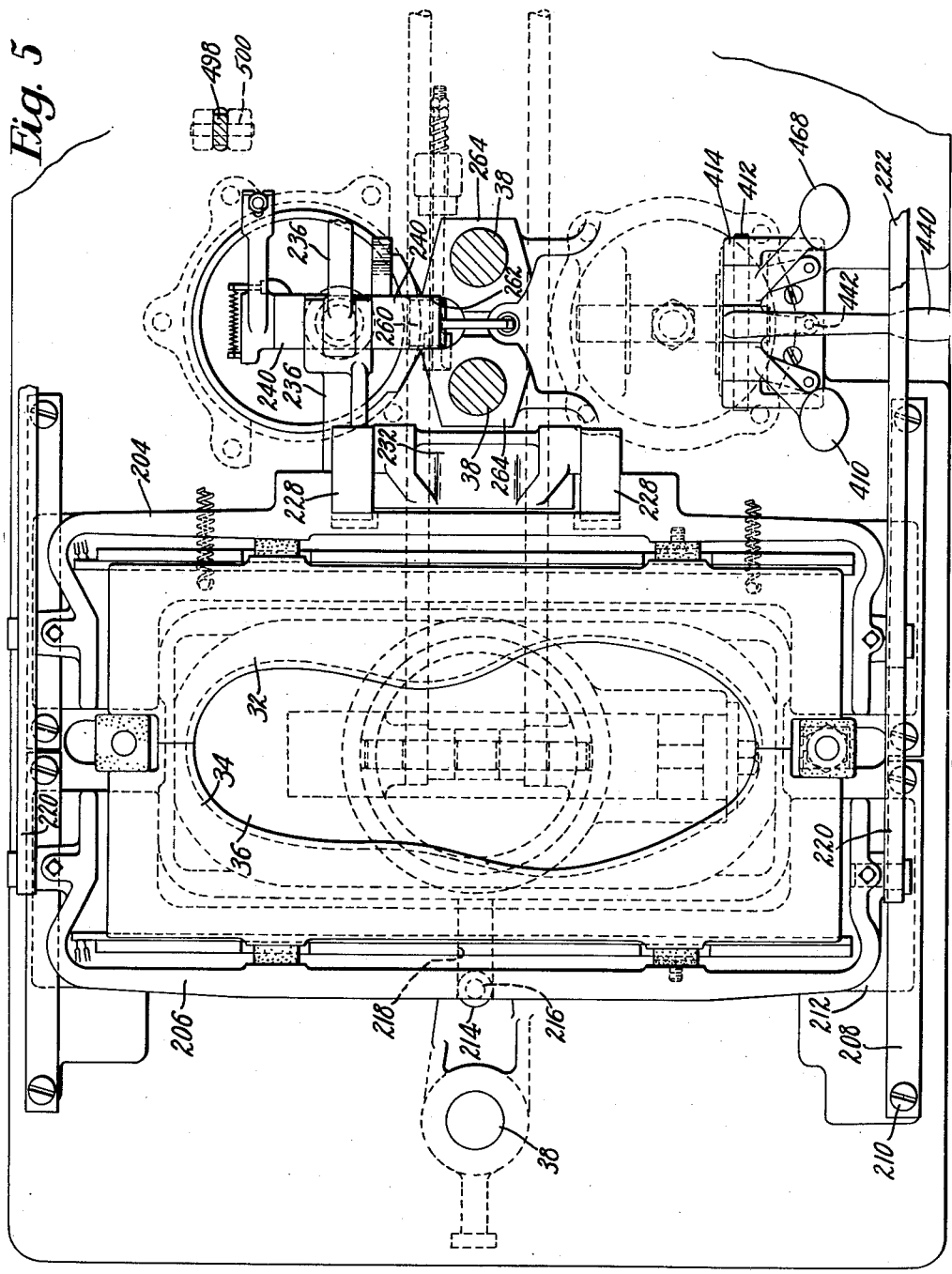
FIG. 5 is a plan view illustrating one of the two molding stations of the machine with the side mold members in closed position, certain parts being broken away and other parts being shown in section.

The invention is illustrated in the drawings as embodied in a two-station machine for vucanizing sponge rubber soles onto shoe bottoms and comprises in each of its two stations a shoe form 30 (FIG. 1) for supporting a lasted shoe upper during the vulcanizing of a sole thereto, an inner side mold member 32 (FIG. 5), an outer side mold member 34 and a bottom mold member 36. For supporting each shoe form 30 for inverting movement to transfer the form from a loading station to an intermediate station and for reverting movement to return the form to the loading station the illustrated machine is provided with a pair of parallel vertical rods 38 (FIG. 1) slidable vertically in alined bores formed in a main casting 40 and in brackets 42 secured to the casting, the lower end portions of each pair of rods being connected together by a crosshead 44. The upper end portions of the outer rods 38 have secured thereon journal blocks 46 and the innermost of said rods have secured thereon journal blocks 48. Mounted in each journal block 46 is an axle bolt 50 which is secured to the hub 52 of a crosshead 54 by clamping nuts 56. Projecting from a hub 58 at the inner end of each crosshead is a pin 60 which is pivotally mounted in the journal block 48. Each of the axle bolts 50 rotates in a sleeve 62 (FIG. 2) which is slidable in a bore in the journal blocks 46 to facilitate axial adjustment of the crosshead 54. It will be understood that such adjustment of the crosshead adjusts the position of the shoe form 30 widthwise thereof relatively to the mold members. Each sleeve 62 is secured in adjusted position in its journal block by a set screw 64.

Figure 1:
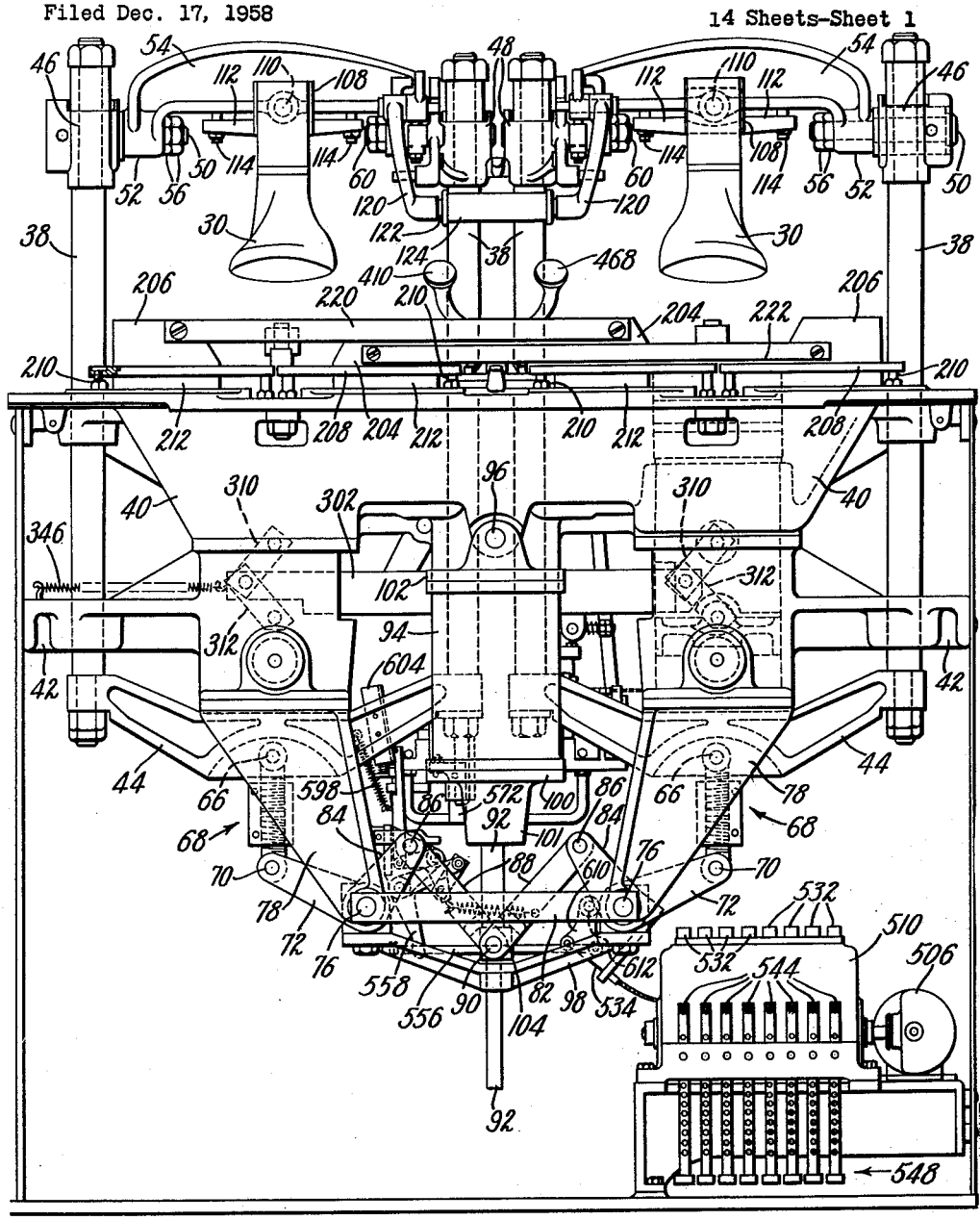
FIG. 1 is a front elevation of a machine embodying the features of the present invention.
Figure 2:
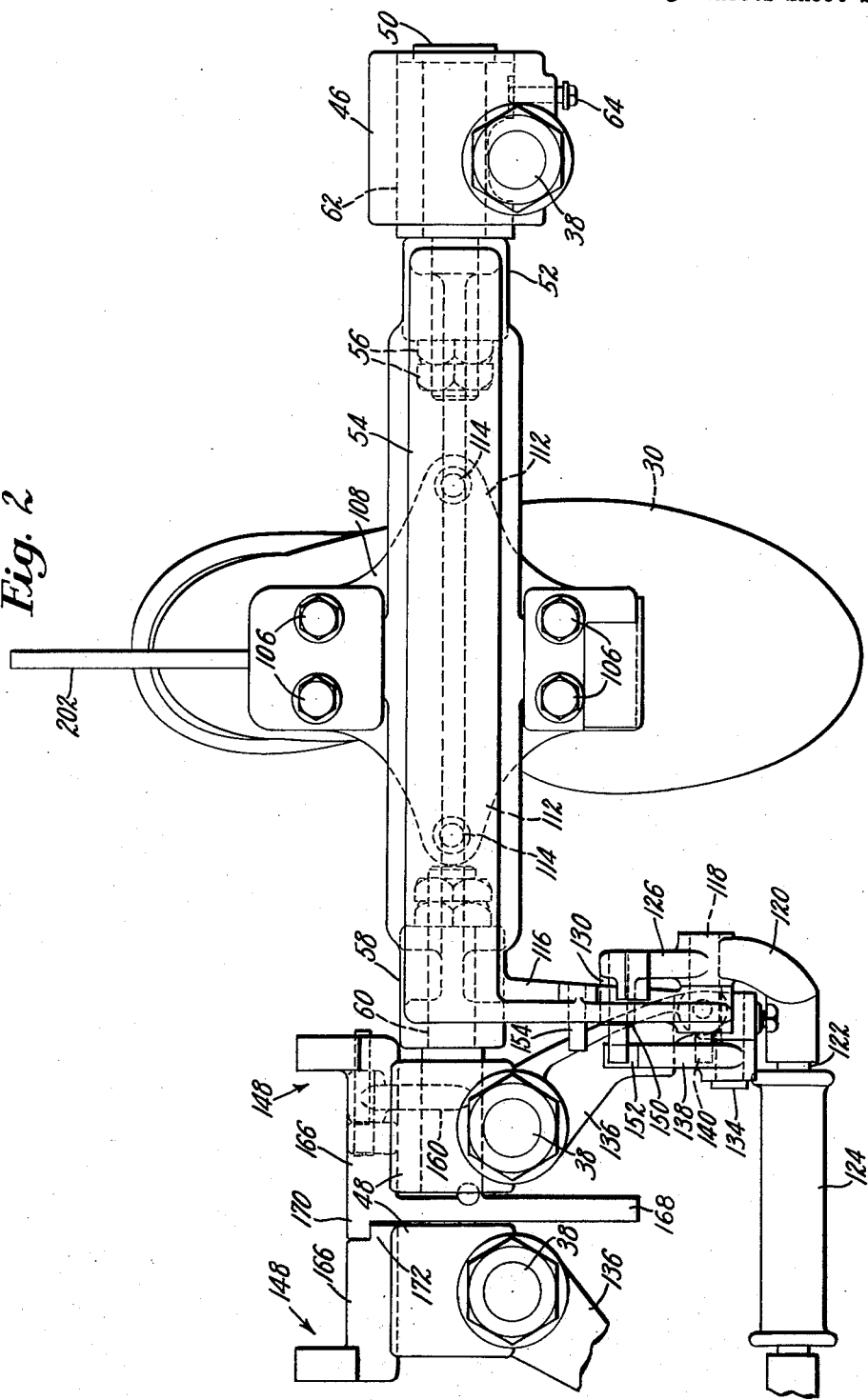
FIG. 2 is a plan view of a shoe form supporting means incorporated in the machine.

For raising and lowering each shoe form 30 relatively to the mold members the following mechanism is provided. Pivotally connected to each crosshead 44 midway between its ends by means of a pin 66 (FIGS. 1, 9 and 17) is the upper end portion of an extensible link 68. The lower end portion of the link is pivotally connected by means of a pin 70 between two arms 72 projecting outwardly from a hub 74 freely mounted on a shaft 76 carried by arms 78 depending from a bracket 80 secured to the lower portion of the bracket 42. The lower end portions of the arms 78 are connected by a crossbar 82 the ends of which are mounted respectively on the two shafts 76, as shown in FIG. 1. Projecting upwardly and inwardly from each hub 74 are two arms 84 which are pivotally connected by pins 86 to the upper ends respectively of two links 88 the bifurcated lower end portions of which are connected by a pivot pin 90 to a piston rod 92 extending downwardly from a piston which moves vertically in a cylinder 94. The cylinder 94 depends from the casting 40 to which it is connected by a pin 96. In order to maintain a vertical disposition of the piston and cylinder assembly the lower end portion of the piston rod 92 is slidably mounted in a bore in a bent crossbar 98 secured to the arms 78. A head 100 at the lower end of the cylinder 94 is provided with a downwardly extending boss 101 which is bored to provide a bearing for the upper portion of the piston rod 92. Mounted in the cylinder 94 between a head 102 and the piston mounted therein is a compression spring (not shown) which urges the piston downwardly into a position in which the parts are arranged as shown in FIG. 1. In this position a collar 104 secured to the piston rod 92 and carrying the pivot pin 90 is arranged adjacent to the upper surface of the bent crossbar 98. In this position the links 88, operating in conjunction with the arms 84 and 72, operate to hold the rods 38 and the shoe forms carried thereby in their elevated positions, as shown in FIG. 1. The piston in the cylinder 94 is raised by compressed air conducted into the lower portion of the cylinder operating against the compression spring in the upper portion of the cylinder thereby moving the rods 38 downwardly to advance the shoe forms into operative relation to the mold members.

Figure 3:
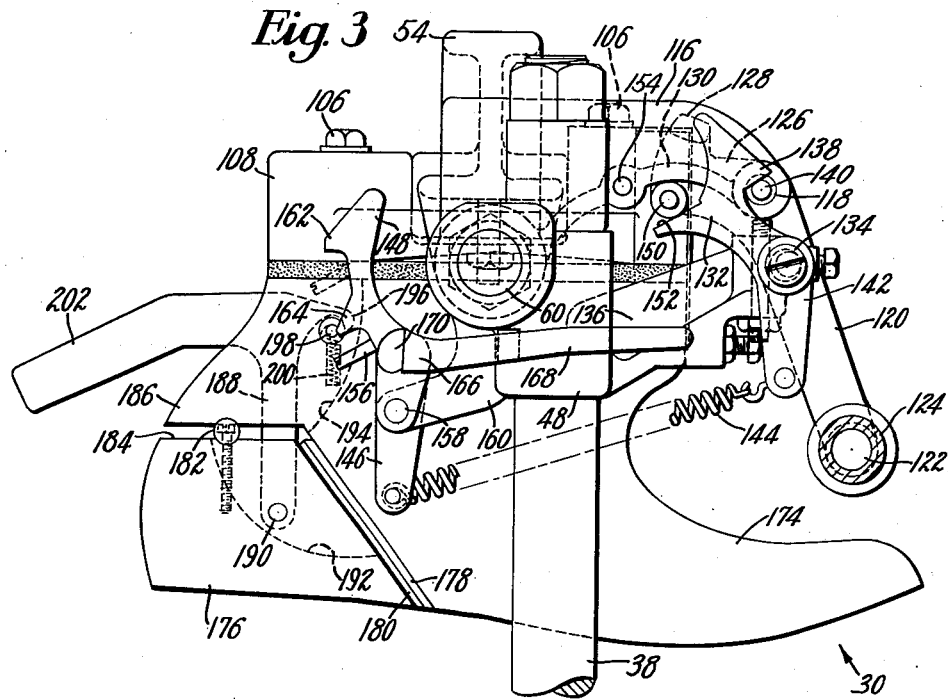
FIG. 3 is a right side elevation of the shoe form supporting means illustrated in FIG. 2, the shoe form being in position to move downwardly into registration with the side mold members.

Each foot form is removably secured by screws 106 to a carrier 108 (FIGS. 2, 3 and 4) mounted on a pin 110 (FIG. 1) extending lengthwise of the shoe form and supported in bores in the crosshead 54. Each carrier 108 has oppositely extending lateral portions 112 (FIGS. 1 and 2) which carry at their end portions set screws 114 extending upwardly into engagement with the crosshead 54. By adjusting the set screws 114 the angular disposition of each carrier 108 may be adjusted in order to effect a proper registration of each shoe form widthwise thereof relatively to the mold members. The crossheads 54 rotate in unison on their bearings thereby to swing the shoe forms from a position in which the forms face downwardly, as shown in FIG. 3, into a position shown in FIG. 4 in which the bottoms of the forms face substantially upwardly to facilitate the loading of lasted shoe uppers thereon and the unloading of the uppers after soles have been vulcanized thereto. Suitable means is provided for latching the shoe forms in their loading positions and molding positions, respectively.

Figure 4:
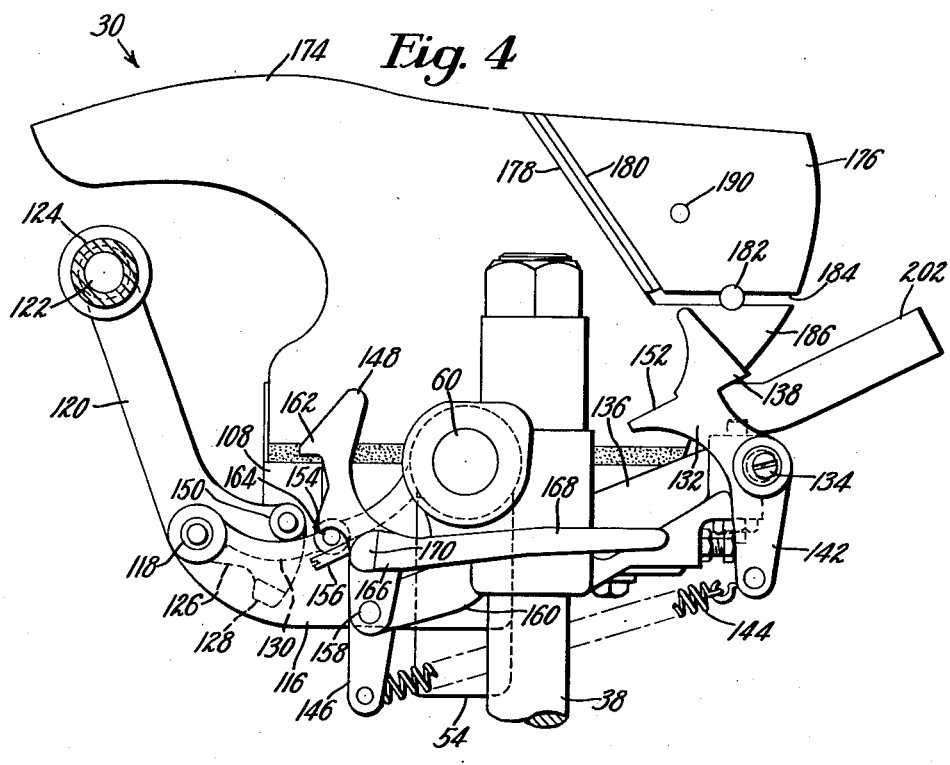
FIG. 4 is a right side elevation illustrating the shoe form in one of two alternative loading positions.

For inverting each shoe form 30 the illustrated machine is provided with mechanism now to be described. Extending forwardly from the inner end portion of each crosshead 54 is an arm 116 (FIGS. 2, 3 and 4), and pivotally mounted on a pin 118 extending laterally from each arm 116 is a lever 120. The two levers 120 are connected together by a rod 122 carrying a freely rotatable handle 124. The short arms 126 of the levers carry inwardly directed lugs 128 which are so arranged that rotation of the levers 120 in a counterclockwise direction, as seen in FIG. 3, by the handle 124 causes the lugs to engage ribs 130 formed in the arms 116 thus to swing the crosshead 54 approximately 180° thereby to invert the shoe forms 30. For latching the shoe forms in their respective operative positions illustrated in FIG. 3, latch members 132 are pivotally mounted on adjustable eccentric studs 134 carried by arms 136 formed integrally with the journal blocks 48 on the rods 38. The latch members have hooked portions 138 which are arranged for latching engagement with reduced inner end portions 140 of the pins 118 thereby to hold the shoe forms in their respective operative positions. Depending arms 142 of the latch members 132 are connected to forward ends of tension springs 144, the rear ends of which are connected to depending arms 146 of latch members 148 hereinafter described. The springs 144 urge the latch members 132 into latching position. When the handle 124 is swung forwardly and upwardly each of the rolls 150 carried by the arms 126 engages a surface 152 of one of the latch members 132 thus swinging the latch member to disengage it from the pin 118 and continued movement of the handle 124 causes the lug 128 to engage the rib 130 and swing the crosshead 54 thereby to carry the shoe form 30 to one of two inverted positions determined by the engagement of a pin 154 with a pin 156 which may be mounted in the latch member 148 in either of two positions one of which is shown in full lines in FIG. 3 and the other in broken lines. Each latch member 148 is pivotally mounted on a pin 158 mounted in an arm 160 formed integrally with the journal blocks 48. The latch members 148 are provided, respectively, with two detents 162 and 164 (FIG. 4). One or the other of said detents will engage the pin 154, depending upon the position of the pin 156. If the pin 156 is in its uppermost position illustrated in broken lines in FIG. 3 the shoe forms in their respective loading positions will be so arranged that the bottom of the form extends upwardly and to the rear. This arrangement of the forms facilitates the loading thereof by operators who are relatively short in stature. The springs 144 operate to swing the latch members 148 counterclockwise, as seen in FIG. 3, into their respective latching positions. For swinging the latch members 148 clockwise away from the pins 154 said latch members are provided, respectively, with laterally extending portions 166 which extend inwardly toward each other. One of these portions has a forwardly extending hand lever 168 (FIG. 2) formed integrally therewith and having formed thereon an abutment 170 positioned in back of an abutment 172 formed on the portion 166 of the other latch member 148. The organization above described is such that downward movement of the hand lever 168 swings both the latch members in a clockwise direction, as seen in FIG. 3, to release the pins 154 whereupon the handle 124 may be pulled forward and downward to swing the shoe forms into their respective operating positions after lasted shoe uppers have been loaded thereon.

Referring to FIGS. 3 and 4, each shoe form 30 comprises a forepart 174 and a heel part 176 which is detachable from the forepart to provide for the shortening of the form to facilitate loading and unloading thereof. The forepart and heel part meet at a plane extending upwardly and heelwardly from the bottom of the form, the bearing surfaces comprising plates 178 and 180 secured to the forepart and the heel part, respectively. A cylindrical bearing member 182 is secured to the heel part 176 and arranged to extend transversely of the plane surface 184 formed therein. The bearing member seats in a recess formed in a rearward extension 186 of the forepart 174, said extension having a plane upper surface parallel to the surface 184. For holding the forepart and the heel part together a latch member 188 (FIG. 3) is pivotally mounted on a cross pin 190 in the heel part 176, and arranged to extend upwardly therefrom through a groove 192 formed in the heel part. The extension 186 is provided with a similar groove 194 for receiving the latch member. The latch member has formed therein a detent 196 which is arranged when the heel part is in assembled relation to the forepart to engage a cross pin 198 extending through the groove 194, the cross pin being mounted in suitable slots (not shown) in the extension 186 so that springs 200 mounted in suitable sockets in the extensions 186 urge the pin 198 upwardly into latching engagement with the detent 196. The latch member 188 is provided with a handle 202 which extends heelwardly beyond the end of the shoe form to facilitate the operation of the latch member to disengage its detent 196 from the cross pin 198.

Figure 6:
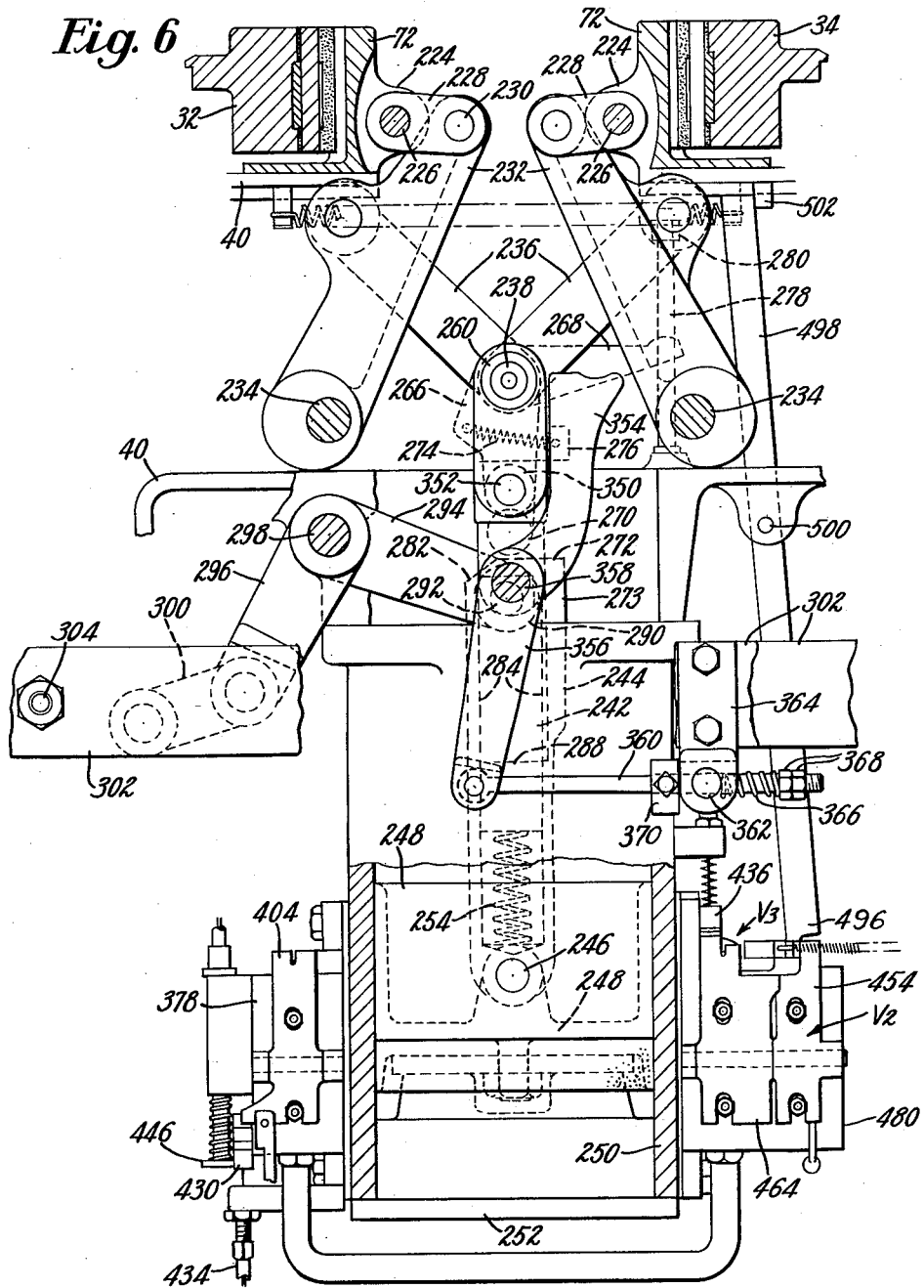
FIG. 6 is a front elevation illustrating mechanism for operating the mold members, certain parts being broken away and other parts being shown in section.
Figure 7:
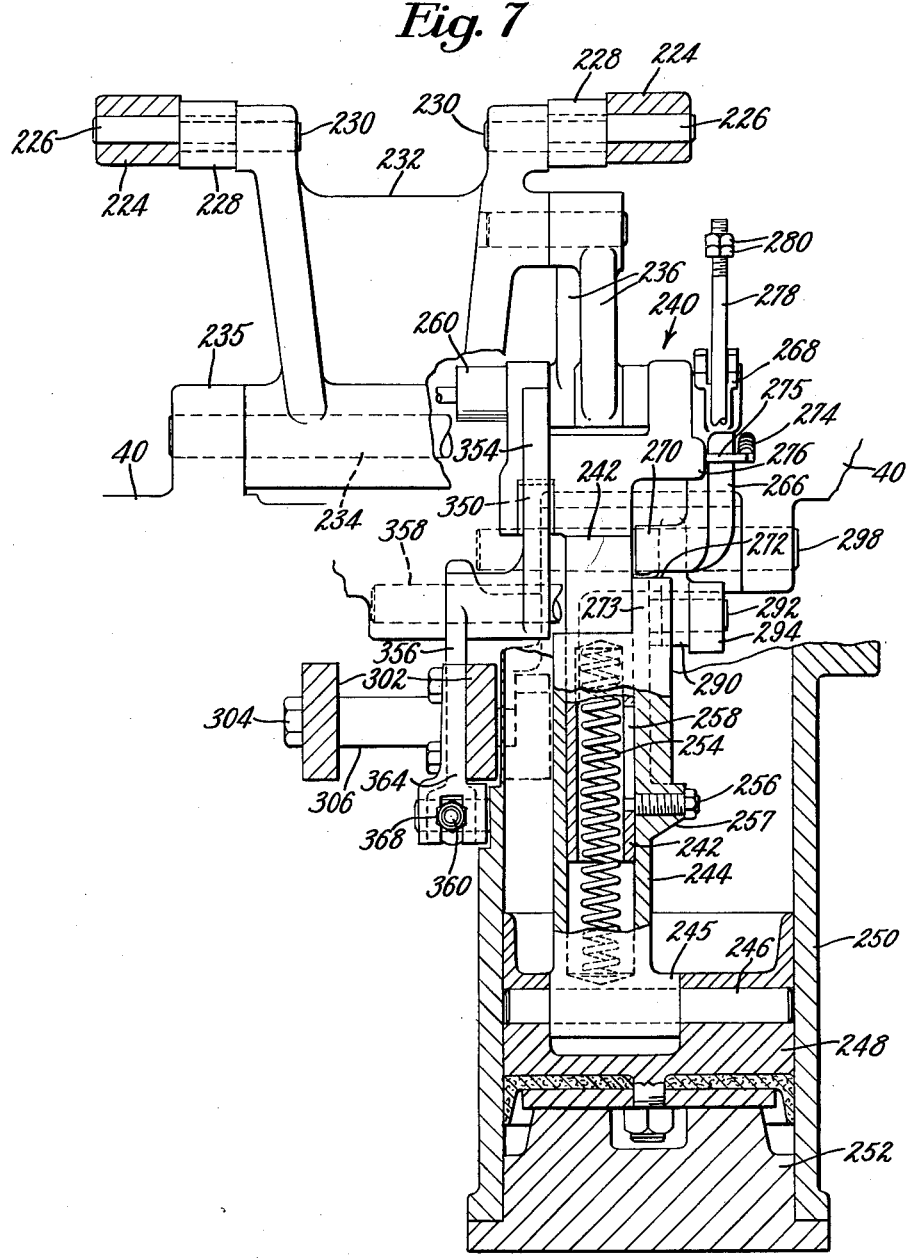
FIG. 7 is a right side elevation of certain mechanism shown in FIG. 6, partly in section in a vertical plane common to the axis of the piston and cylinder assembly illustrated therein.
Figure 8:
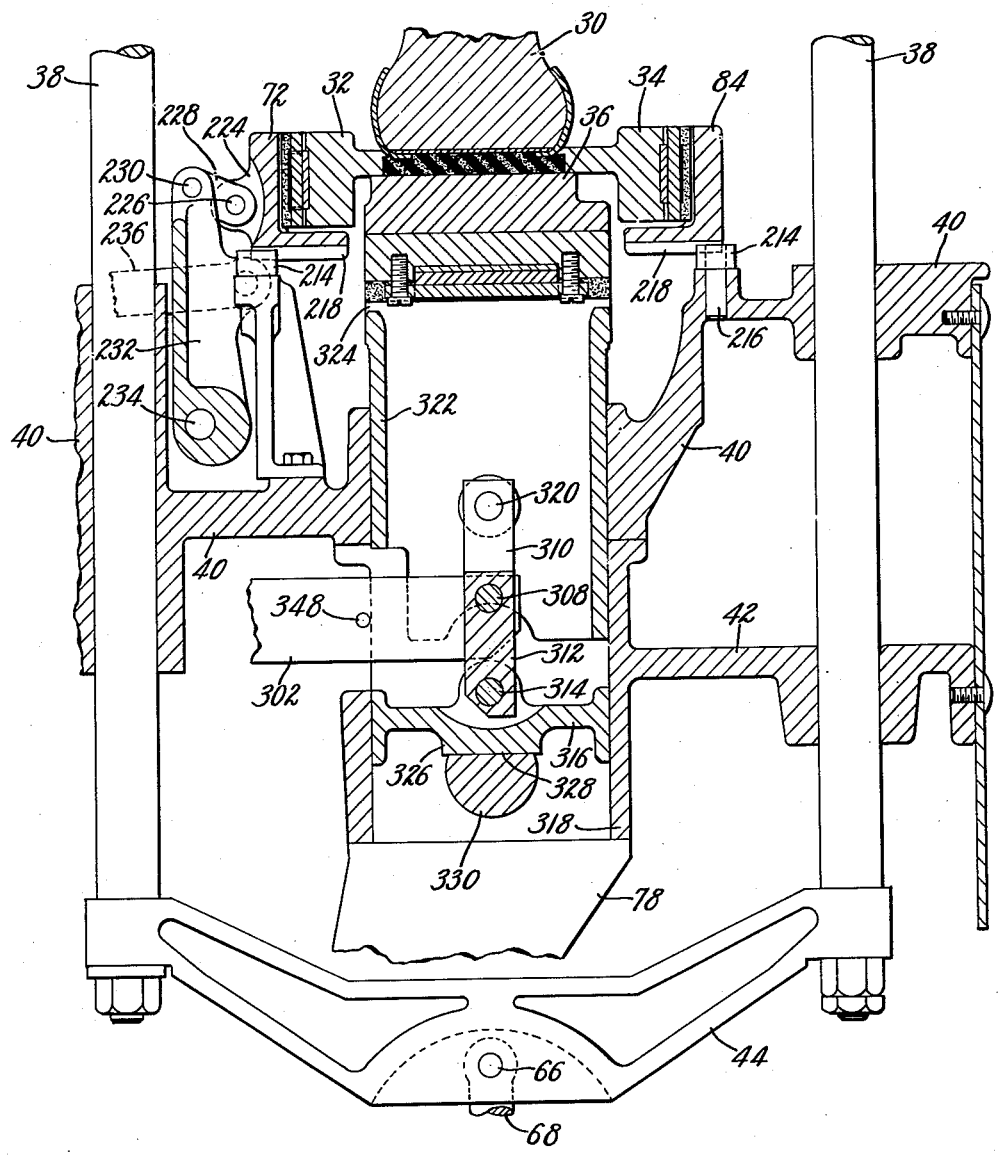
FIG. 8 is a front elevation of the mechanism for raising and lowering the shoe forms, largely in section on a plane extending widthwise of the machine through the axes of the vertical bars on which the shoe form supports are carried.
Figure 9:
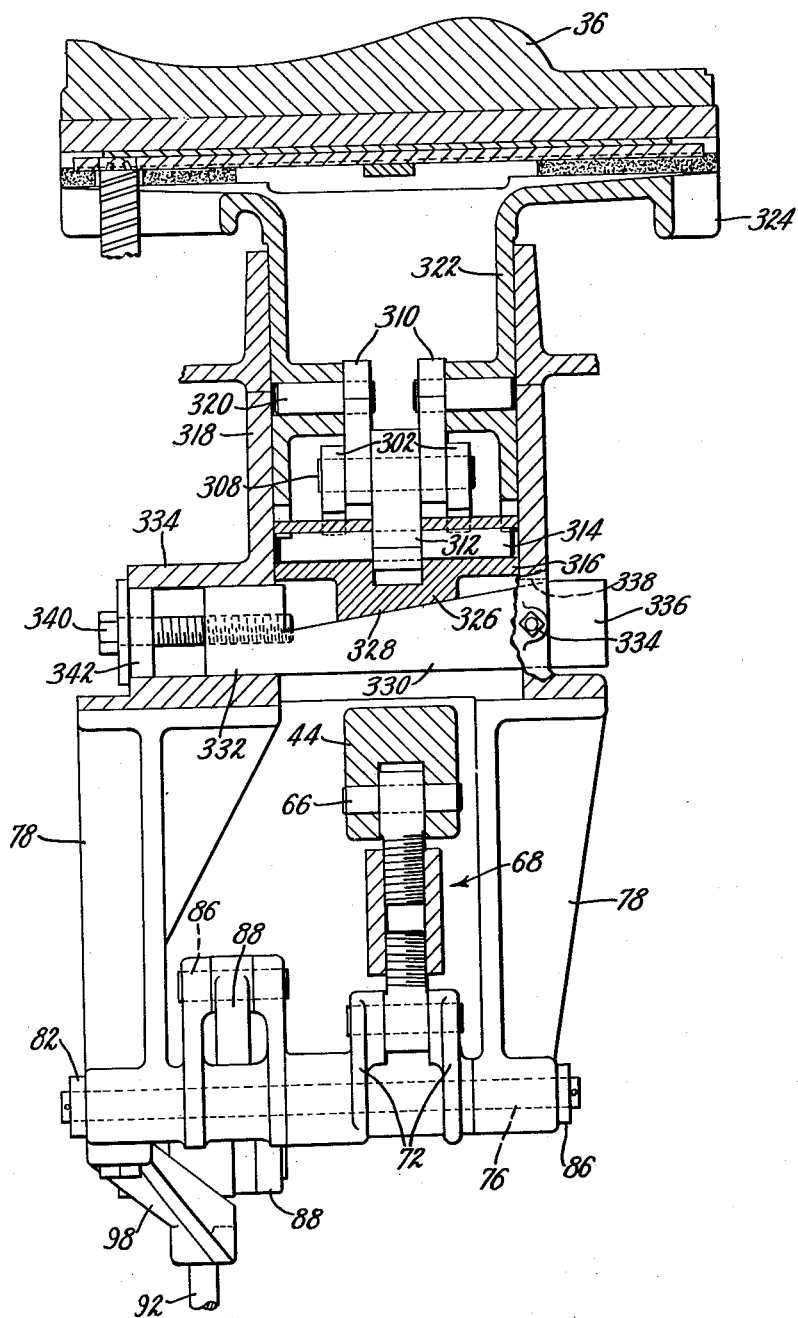
FIG. 9 is a right side elevation illustrating mechanism for raising and lowering one of the sole molds, certain parts being shown in section on a plane common to the longitudinal median line of the sole mold member.

The side mold members 32 and 34 are mounted respectively in carriers 204 and 206 (FIGS. 1, 5 and 8), said carriers being mounted for sliding movement widthwise of the machine on upper surfaces of the main casting 40. The carriers are held against upward movement by rails 208 mounted on bolts 210 extending upwardly from the main casting 40 and arranged in contacting relation to the upper surfaces of ribs 212 (FIG. 5) projecting horizontally from the front and rear extremities respectively of the carriers. The path of movement of each carrier is determined by a roll 214 (FIGS. 5 and 8) rotatably mounted on a stud 216 extending upwardly from the main casting 40, the roll being received in a guideway or groove 218 formed in the bottom of the carrier and extending widthwise of the machine. The outer mold carrier 206 at the left side of the machine is connected by front and rear links 220 (FIGS. 1 and 5) to the inner mold carrier 204 at the right side of the machine. Similarly, the outer carrier 206 at the right side of the machine is connected to the inner carrier 204 at the left side of the machine by front and rear links 222 (FIG. 1) arranged beneath the links 220. Thus, it will be seen that the movement of each inner mold carrier 204 effects like movement of the outer carrier 206 in the opposite station. Each inner carrier 204 is provided with a pair of lugs 224 (FIGS. 6, 7 and 8) extending laterally toward the center of the machine. Each pair of lugs carries a cross pin 226 on which is pivotally mounted one end of a link 228 the other end of which is pivotally connected by a pin 230 to the bifurcated upper end portion of an arm 232 pivotally mounted at its lower end on a pin 234 mounted in bosses 235 (FIG. 7) formed in the main casting 40. Pivotally connected to each arm 232 substantially midway between its ends is the outer end portion of one of a pair of toggle links 236. The inner ends of the toggle links are pivoted together on a pin 238 mounted in the bifurcated head 240 (FIG. 7) of a sleeve member 242 slidably mounted for vertical movement in a tubular member 244 the headed lower end portion 245 of which is mounted on a pin 246 carried by a piston 248 which slides vertically in a cylinder 250 which is open at its upper end but closed at its lower end by a head 252. Mounted within the sleeve 242 is a compression spring 254, the lower end of which bears against the head 245 of the tubular member 244 and the upper end against a solid upper portion of the sleeve 242 so that the spring urges the sleeve upwardly to a limit determined by the engagement of a pin 256 mounted in a boss 257 in the tubular member 244 with the lower end wall of a slot 258 formed in and extending longitudinally of the sleeve 242. Upward movement of the sleeve 242 by the spring 254 swings the toggle links 236 toward their straightened position thus swinging the arms 232 in opposite directions away from each other and advancing the inner mold carriers 204 outwardly from their positions in FIG. 6 to their positions illustrated in FIG. 8. Such movement of each inner mold carrier is imparted to the outer mold carrier 206 in the opposite station by the links 220 and 222. The operation of the spring 254 only partially advances the side mold members toward their respective closed positions, the final stage of their closing movement being effected by means hereinafter described. The path of movement of the head 240 of the sleeve member 242 is determined by a roll 260 (FIGS. 5 and 7) mounted on an extension of the toggle pin 238 for movement between vertical surfaces 262 formed in portions of the main casting. Mounted for swinging movement on the pin 238 is a bell crank lever having arms 266 and 268 (FIGS. 6 and 7). The arm 266 extends downwardly and forwardly and its lower end portion provides an offset abutment 270 which overlies the upper end face 272 of an upward extension of the tubular member 244. The vertical arm 266 serves as a spacer member through which the tubular member 244 actuates the toggle links 236. The bell crank lever is normally held in its position illustrated in FIG. 6 by a tension spring 274 one end of which is anchored to a pin on the arm 266 and the other end to a pin 275 (FIG. 7) on a lug 276 projecting rearwardly from the head 240 of the sleeve 242, the normal position of the bell crank lever being determined by its engagement with the lug. The arm 268 of the bell crank lever extends widthwise of the machine and has a bifurcated end portion which embraces a rod 278 mounted in and extending upwardly from a portion of the main casting 40. At its upper extremity the rod 278 has threaded thereon nuts 280. Upward movement of the piston 248 by compressed air in the lower portion of the cylinder 250 causes like movement of the tubular member 244 thus compressing the spring 254 and moving the sleeve 242 upwardly until the surface 272 of the upward extension 273 engages the offset abutment 270 on the arm 266. Further upward movement of the piston imparts like movement to the pin 238 to straighten the toggle links and thus to move the side mold members toward their respective closed positions. The advancement of the side mold members causes the arm 268 of the bell crank lever to engage the lowermost of the nuts 280 and further upward movement of the tubular member 244 causes the bell crank lever to swing in a clockwise direction, as seen in FIG. 6, thereby disengaging the abutment 270 from the surface 272, the abutment finally being cammed away from the surface 272 by an inclined surface 282 (FIG. 6) formed in the upwardly projecting portion of the tubular member 244. Further upward movement of the tubular member elevates the sole mold members 36 as will now be described. Formed in an outer portion of the tubular member 244 is a vertical recess 284 (FIG. 6) terminating in a bottom surface 288 which is so located that as the abutment 270 is cammed away from the surface 272 the surface 288 engages the bottom of a block 290, said block being pivotally mounted on a pin 292 fixed in an arm 294 of a bell crank lever the other arm of which is identified by the numeral 296. The bell crank lever is fulcrumed on a pin 298 mounted in lugs formed in the casting 40 and the arm 296 is connected by a link 300 to a pair of parallel bars 302 secured together by a bolt 304 in a spaced relation determined by a spacing sleeve 306 mounted on the bolt (FIG. 7). The opposite ends of the bars 302 are connected together by a cross pin 308 (FIGS. 1, 8 and 9) which also connect together upper and lower toggle links 310 and 312. As shown in FIG. 9, there are two links 310 and one lower link 312 which is pivotally mounted on a cross pin 314 carried by a piston 316 mounted in the lower end portion of a cylinder 318 depending from the bracket 42. It will be understood that the mechanism above described which, as shown in FIG. 8, is incorporated in the molding assembly at the right side of the machine, is duplicated in the assembly at the left side of the machine. Upper end portions of the links 310 are pivotally connected by pins 320 to the lower extremity of a tubular member 322 extending downwardly from a structure 324 on which the sole mold member 36 is supported. The piston 316 has a depending boss 326 having an angular bottom surface 328 (FIG. 9) which engages the inclined upper surface of a wedge 330. The wedge has a cylindrical left end portion 332 slidably mounted in a tubular extension 334 at the lower portion of the cylinder 318 and at its right end the wedge has a cylindrical extension 336 which is slidably mounted in a bore 338 at the right side of the cylinder 318. By longitudinal adjustment of the wedge 330 the vertical position of the piston 316 and of the sole mold supporting means carried thereby is adjusted. For so adjusting the wedge 330 a screw 340 is mounted in a flanged plug 342 mounted in the extension 334 and is threaded into a tapped axial bore in the extension 334. The flange of the plug 342 bears against the annular end face of the extension 334 to hold the plug against axial movement as the screw is operated to move the wedge to the left, as seen in FIG. 9. A set screw 344 is provided for clamping the wedge in its adjusted position. A tension spring 346 (FIG. 1), anchored at one end to the bar 302 and at the other end to the bracket 42, urges the bar 302 to the left, as seen in FIG. 1, thus urging the toggle links 310 and 312 into their broken position. When the bell crank lever 294, 296 (FIG. 6) is swung counterclockwise, as seen in said figure, the bar 302 is moved to the right to straighten the toggle links 310 and 312, such movement being limited by the engagement of a pin 348 (FIG. 8) in the bar 302 with a portion of the bracket 42. The operation of the toggle links elevates the sole molds into molding position relatively to the side mold members.

For completing the straightening of the toggle links 236 (FIG. 6) to complete the closing of the side mold members the following mechanism is provided. A roll 350 is mounted on a pin 352 carried by the head 240, the head being recessed to receive the roll. A two-armed lever 354, 356 is fulcrumed on a pin 358 mounted in the main casting 40. The arm 356 extends downwardly and is pivotally connected at its lower end portion to a pull rod 360 which extends through a bore in a trunnion pin 362 mounted in a bracket 364 secured to one end of the bar 302 at the right side of the machine. A compression spring 366 surrounds the right end portion of the rod 360 and is confined between the trunnion pin 362 and nuts 368 on the threaded extremity of the rod. The spring 366 urges the rod to the right, as seen in FIG. 6, to a limit determined by the engagement of a collar 370 on the rod with the bracket 364. Initially the lever arm 354 is so positioned that it extends upwardly just to the right of the roll 350 and the head 240. After the straightening of the toggle links 236 has been completed by the operation of the two-armed lever 354, 356, the arm 354 thereof serves as a retainer for holding the side mold members against opening movement.

Figure 10:
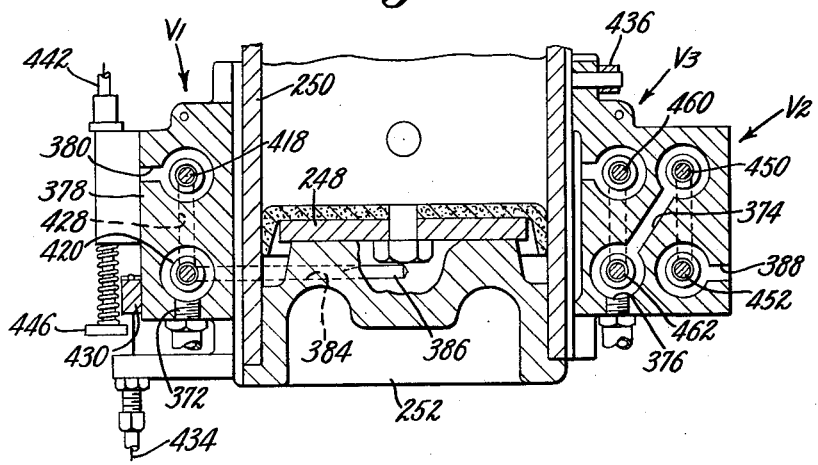
FIG. 10 is a detail view in front elevation illustrating certain valve mechanisms in the fluid pressure system for operating the mold actuating mechanism and the mechanism for raising and lowering the shoe forms, largely in section on a plane common to the axis of a piston and cylinder shown therein.
Figure 12:
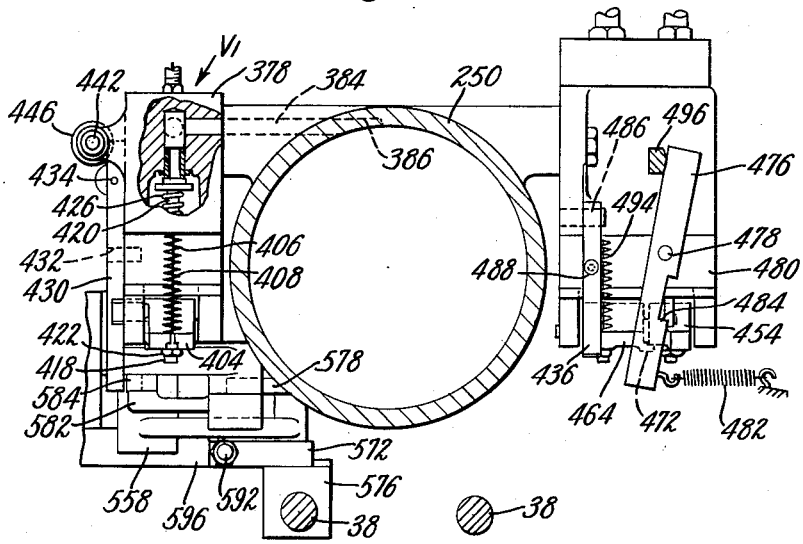
FIG. 12 is a plan view illustrating mechanism shown in FIG. 10.
Figure 13:
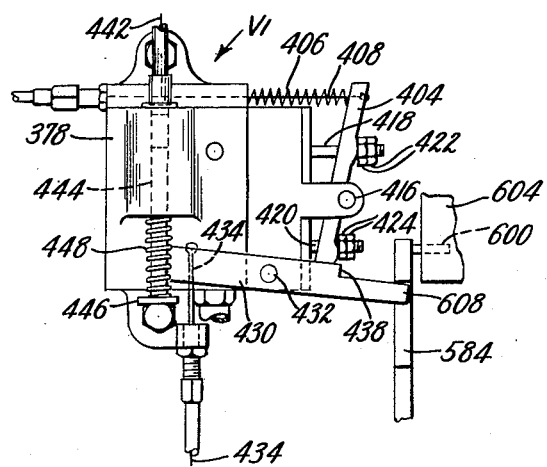
FIG. 13 is a left side elevation of a valve mechanism for controlling mechanism for operating the mold members.

For operating the illustrated machine compressed air is transmitted either from a factory supply or from a suitable compressor to an inlet port 372 (FIGS. 10 and 18) of a valve V1 controlling the movements of the side mold members and the sole mold member. Compressed air is also transmitted to inlet ports 374 and 376 of valves V2 and V3 controlling the vertical movements of the shoe forms. The valve V1 has a valve casing 378 having formed therein an exhaust port 380 (FIG. 10) and a service port 382 (FIG. 18) connected by a passage 384 to a port 386 in the lower portion of the cylinder 250. The valve V2 (FIG. 10) has an exhaust port 388 and a service port 390 connected by a tube 392 to a port 394 at the upper end of the cylinder 94. A valve V3 has an exhaust port 396 and a service port 398 (FIG. 18) connected by a tube 400 to a port 402 in the lower portion of the cylinder 94. The valve V1 has a shifting lever 404 (FIGS. 12 and 13) which is operated against a return spring 406 by a Bowden wire 408 connected to a trip lever 410 (FIG. 5) fulcrumed on a cross pin 412 mounted in a bracket 414 secured to the machine frame. The lever 404 is fulcrumed between its ends on a pin 416 mounted in an extension of the valve casing 378. Upper and lower portions of the lever are bifurcated to embrace upper and lower valve stems 418 and 420, respectively. Nuts 422 and 424 on the valve stems, respectively, are engaged by the lever 404 so that swinging movement of the lever operates the valve V1 by shifting the valve stems 418 and 420 against the pressure of return springs surrounding the stems within the valve casing 378, the spring for the valve stem 420 being identified by the numeral 426 in FIG. 12. Rearward movement of the upper portion of the trip lever 410 swings the shifting lever 404 in a counterclockwise direction, as seen in FIG. 13, to move the valve stem 420 to the right thus opening the port 382 and allowing the spring on the valve stem 418 to move said stem to the left, as seen in FIG. 13, thereby to close communication between a passage 428 and the exhaust port 380, said passage 428 being a branch of the passage 384. Thus, air under pressure is admitted to the lower portion of the cylinder 250 through the passage 384 and the port 386 to elevate the piston 248 which advances the mold members toward their respective operative positions. The valve V1 is retained in the position effected by the operation of the shifting lever 404 by means of a latch member 430 which is pivoted between its ends on a pin 432 (FIG. 13) mounted in the valve casing 378. One arm of the latch member 430 is connected by a Bowden wire 434 to another latch member 436 hereinafter described. When the lever 404 is swung counterclockwise, as seen in FIG. 13, the latch member 430 swings counterclockwise upon the pin 432 so that a shoulder 438 formed in the latch member 430 holds the lever 404 against clockwise movement, as seen in FIG. 13, the latch member 430 moving freely relatively to the end portion of the cable 434.

In the event that the operator decides to open the molds without completing the machine cycle he moves an emergency stop lever 440 (FIG. 5) upwardly. The lever 440 is fulcrumed on the pin 412 and is connected by a Bowden wire 442 (FIG. 13) to a plunger 444 having a flange 446 underlying the left end portion of the latch member 430. The flange 446 is urged downwardly by a spring 448. When the latch member 430 is in latching position upward movement of the plunger 444 effected by the operation of the lever 440 causes the flange 446 to swing the latch member in a clockwise direction, as seen in FIG. 13, to release the shifting lever 404 to the action of the spring 406 which swings the lever in a clockwise direction to return it to its position shown in FIG. 13. This moves the valve stems 418 and 420 back to their respective original positions in which the lower portion of the cylinder 250 is connected to exhaust through the passages 384 and 428 and communication between the ports 372 and the port 382 is cut off.

Figure 11:
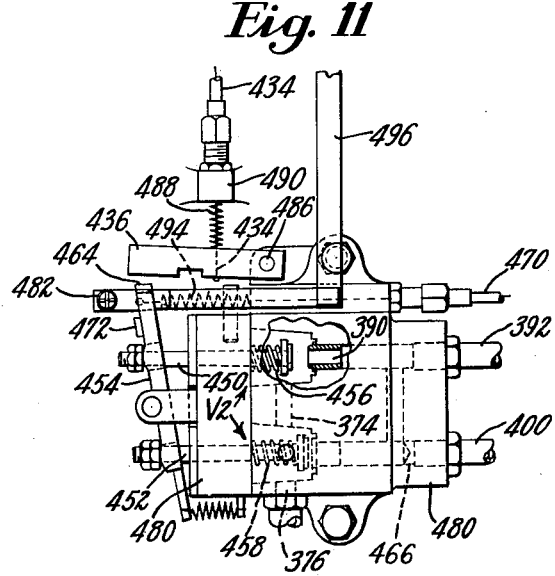
FIG. 11 is a right side elevation of a valve mechanism illustrated in FIG. 10.

The valve V2 comprises upper and lower valve stems 450 and 452 (FIG. 11) operated by a shifting lever 454 and having, respectively, return springs 456 and 458. The operation of the valve V2 is generally similar to the operation of the valve V1 hereinbefore described. The valve V3, like the valve V2, comprises upper and lower valve stems 460 and 462 (FIG. 10) operated by a shifting lever 464 (FIG. 12).

Figure 18:
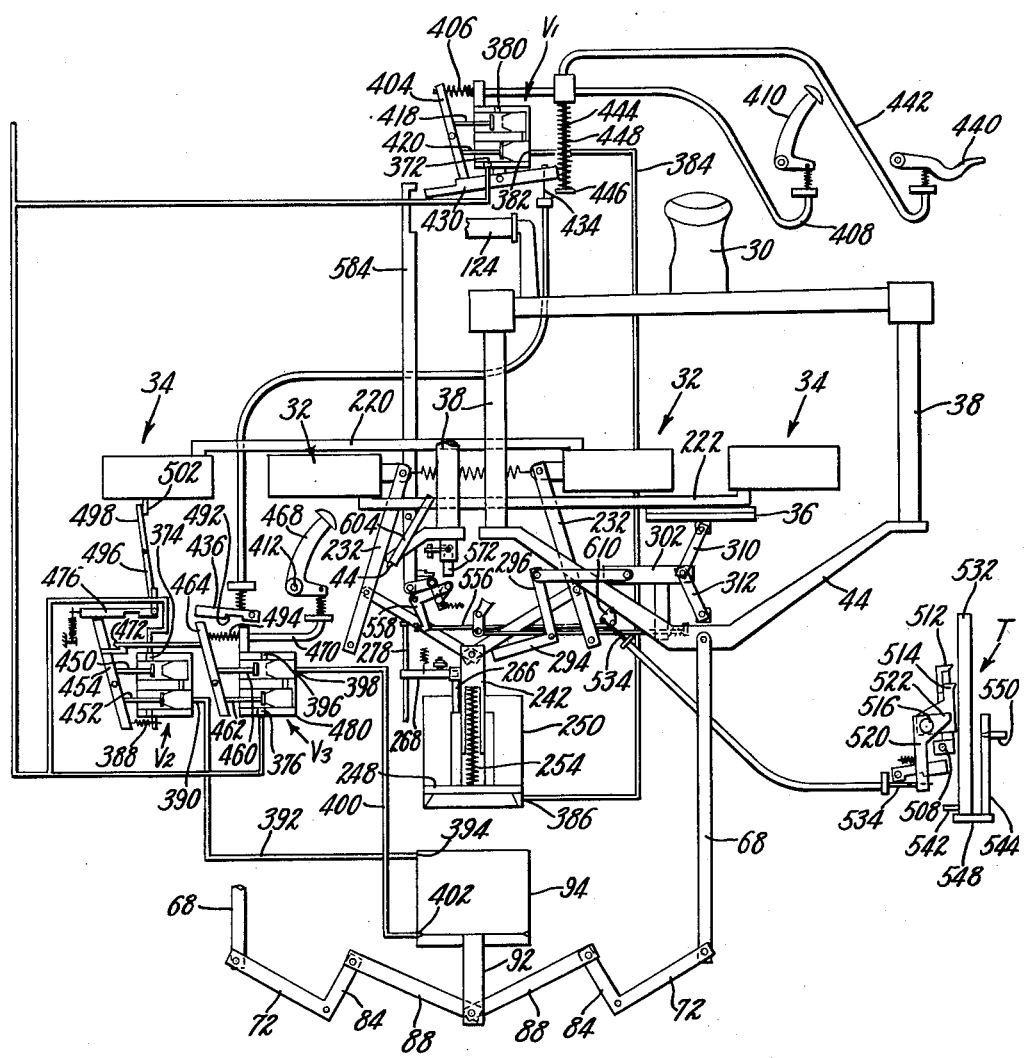
FIG. 18 is a front elevation illustrating diagrammatically certain fluid pressure operated mechanisms and associated parts.

When the machine is at rest the parts are in the positions shown in the drawings, the lower end portion of the cylinder 94 being connected to the exhaust side of the system through the port 402 (FIG. 18), the tube 400, a passage 466 and the open upper portion of the valve V3 to the exhaust port 396. The upper end of the cylinder 94 is connected to the pressure side of the system through the port 394, the tube 392, the port 390 and the upper portion of the valve V2 to the inlet port 374. The piston in the cylinder 94 is thus held in its lowermost position with the shoe forms elevated. For operating the valves V2 and V3 to lower the shoe forms after the mold members have been closed, by compressed air flowing through the valve V1, as above described, there is provided a trip lever 468 pivotally mounted on the pin 412. The lower end portion of the lever 468 is connected by a Bowden wire in a cable 470 to the upper end portion of the lever 464 which has formed therein a shoulder 472 (FIG. 12) positioned in front of the lever 454. Rearward movement to the upper portion of the trip lever 468 swings the lever 464 in a clockwise direction, as seen in FIG. 18, and the lever 464 in turn imparts clockwise movement to the lever 454 which shifts the valve stems 450, 452, 460 and 462 thereby to connect the upper portion of the cylinder 94 to exhaust through the port 394, the tube 392, a passage 474, the now open lower portion of the valve V2 and the port 388 while the lower portion of the cylinder 94 is connected to pressure through the port 402, the tube 400, the now open lower portion of the valve V3, and the port 376 so that the piston in the cylinder 94 is elevated to lower the shoe form by the operation of linkages hereinbefore described. Each of the levers 454 and 464 is provided with a latch member, the latch member for the lever 454 comprising a lever 476 pivotally mounted on a pin 478 projecting upwardly from a housing 480 provided for the valves V2 and V3. The lever 476 is urged in a counterclockwise direction, as seen in FIG. 12, by a spring 482 thus causing the lever 454, when in its position in FIG. 11, to be engaged by a wall 484 (FIG. 12) of a notch formed in the lever 476. The lever 464 is served by the latch member 436 hereinbefore referred to, said latch member being pivoted on a pin 486 mounted in a lug on the housing 480. The latch member 436 is urged downwardly by a compression spring 488 surrounding an end portion of the Bowden wire 434 and positioned between the latch member 436 and a boss 490 which forms an anchorage for the sheath of the Bowden cable. Thus, when the lever 464 is swung in a clockwise direction, as seen in FIG. 18, it is received within a notch provided in the lower portion of the latch member, one wall 492 of the notch serving to hold the lever 464 against return movement by a spring 494 surrounding an end portion of the Bowden wire in the cable 470 and positioned between the lever 464 and a portion of the housing 480. A tail portion of the lever 476 is engaged by a two-armed lever 496, 498 pivotally mounted on a pin 500 (FIG. 6) fixed in the machine frame. During the opening movements of the side mold members an upper end portion of the arm 498 is arranged to be engaged by a pin 502 depending from one of the side mold carriers (FIG. 6).

Figure 17:
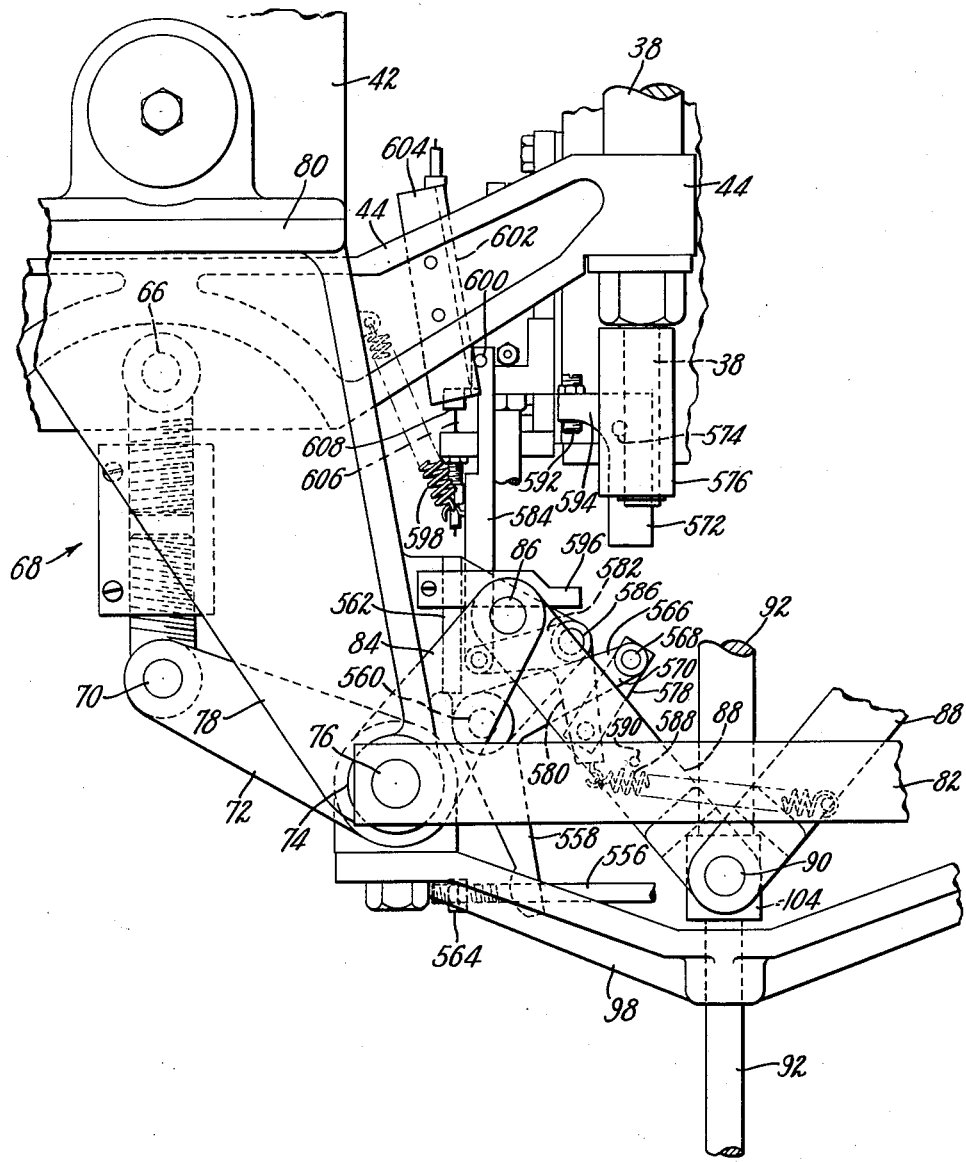
FIG. 17 is an enlarged front elevation illustrating certain operating mechanisms shown in lesser detail in FIG. 1.

The downward movement of the shoe forms 30 to their respective operative positions causes the initiation of the operation of a timing unit T. The timing unit is so constructed and arranged that after the lapse of a period of vulcanization determined by its setting, the latch members 430 and 436 (FIG. 18) are operated thereby to release the levers 404 and 464 in order to cause the opening of the molds and the connection of the lower portion of the cylinder 94 to exhaust. After the side mold members have opened sufficiently to disengage the shoe the lever 496, 498 is swung by the continued opening movement of the side mold members in a counterclockwise direction, as seen in FIG. 11, to cause the latch member to release the lever 454 whereupon the valve V2 is spring returned to its initial setting in which the upper portion of the cylinder 94 is open to pressure which forces the piston therein downwardly thereby to elevate the shoe forms preparatory to the removal therefrom of shoes to which soles have been vulcanized. The illustrated timing unit is provided with eight individual timing mechanisms 504 (FIG. 14) each of which controls the operation of a machine of the type above described. The timing mechanisms, which are similar in construction and operation, are driven by an electric motor 506 which is connected by suitable reduction gearing (not shown) to a drive shaft 508 journaled in a housing 510. Mounted on eccentric portions of the drive shaft are eight oscillators or thrust members 512 and cooperating therewith are eight pawls 514 freely mounted on a cross shaft 516 fixed in the housing 510. The pawls 514 are urged in a counterclockwise direction, as seen in FIG. 15, by spring pressed plungers 518 mounted in bores in the housing 510 and arranged to engage depending portions 520 of bell crank levers 522. The bell crank levers are freely mounted on the cross shaft 516, each beside the pawl 514 on which it operates. The horizontal arm of each bell crank lever is arranged to engage a pin 524 projecting from its pawl. Each pawl engages an ear 526 formed in its thrust member 512 thus swinging the thrust member counterclockwise, as seen in FIG. 15, into engagement with a bar 528 mounted in the housing 510. In this position the pawl and the thrust member are disengaged from teeth 530 formed in rack members 532 slidable vertically in suitable bearings in the housing 510. Connected to the depending portion 520 of each bell crank lever 522 is one end of a Bowden wire 534 the other end of which is connected to an arm or latch member 536 hereinafter described. When the wire is drawn to the left, the bell crank lever 522 is swung in a clockwise direction from its position in FIG. 15 into its position in FIG. 16 allowing each pawl 514 and its thrust member 512 to swing by gravity in a clockwise direction into engagement with the teeth 530 formed in the rack 532. The thrust member 512 receives reciprocating motion from the rotation of the shaft 508 by reason of the eccentricity of that portion of the shaft on which the thrust member is pivotally mounted. During each upward stroke the thrust member moves the rack member 532 upwardly to a fixed extent. The rack member is held against downward movement during the return of the thrust member to its lower position by the engagement of the pawl 514 with one of the teeth 530 in the rack member. The bell crank lever 522, which controls the operation of the thrust member, is held in its position illustrated in FIG. 16 by the latch 536 which is pivotally mounted on a pin 538 mounted in the housing 510 and is arranged to engage a lug 540 (FIG. 14) formed on the tail portion 520. The rack member 532 is ratcheted upwardly by the thrust member 512 until a pin 542 on the rack member engages and lifts the latch member 536 thus freeing the tail portion 520 to the action of the plunger 518 which swings the bell crank lever 522 in a counterclockwise direction, as seen in FIG. 15, thus disengaging the thrust member 512 and the pawl 514 from the rack member and pulling the Bowden wire 534 into its position in FIG. 15. As hereinafter described the operation of the bell crank lever causes the latch member 430 to be disengaged from the shifting lever 404 of the valve V1 and causes the latch member 436 to be disengaged from the lever 464 of the valve V2. The length of time which elapses between the engagement of the thrust member 512 with the rack member 532 and the subsequent disengagement thereof by the operation of the bell crank lever 522, depends upon the initial vertical setting of the rack member which determines the distance between the pin 542 and the thrust member 512. The initial vertical position of the rack member is determined by a time setting member 544 illustrated in the drawings as a bar square in cross section and vertically adjustable in a suitable guideway in an extension 546 of the housing 510. It will be understood that the illustrated organization is provided with eight such time setting members one for each rack 532. Each time setting member or bar 544 has secured to its lower end portion a horizontal arm 548 which supports its rack member by engagement with its lower extremity. The vertical position of each bar 544 is determined by a pin 550 having threaded engagement in a tapped hole in the extension 546. As shown in FIG. 15, the pin 550 has a reduced and tapered end portion which is seated in any one of a plurality of tapered bores 552 formed in the bar 544. When the thrust member 512 and the pawl 514 are disengaged from the teeth of the rack member 532 the rack member moves downwardly by gravity until it rests upon the arm 548 of its time setting bar 544. The left end portion of the Bowden wire 534 is connected to one corner of a triangular lever 610 (FIG. 1) pivotally mounted at another corner thereof on a pin 612 mounted in one of the crossbars 82. Pivotally connected to the third corner of the triangular lever 610 is the right end portion of a rod 556 the left end portion of which extends through a bore in one arm 558 (FIG. 17) of a bell crank lever fulcrumed on a pin 560 carried by a bracket 562 secured to one of the arms 78. The arm 558 is initially positioned on the rod 556 in spaced relation to nuts 564 mounted on the end portion of the rod. The horizontal arm 566 of the bell crank lever carries at its free end a pin 568 on which is freely mounted a roll 570 which is initially positioned in downwardly spaced relation to the lower end of a striker 572 pivotally mounted on a pin 574 fixed in a block 576 secured to the lower end portion of one of the rods 38. The striker normally hangs from the pin 502 in its position in FIG. 17 so that during the downward movement of the shoe form carrying assembly the lower extremity of the striker engages the roll 570 and rotates the bell crank lever in a clockwise direction, as seen in FIG. 17, thus causing the arm 558 of the bell crank lever to engage the nut 564 and to swing the triangular lever 610 (FIG. 1) which in turn pulls on the Bowden wire 534 to initiate the operation of the timing mechanism. Pivotally mounted on the pin 568 (FIG. 17) with the roll 570 is one end portion of a link 578 the other end portion of which is pivotally connected to a depending arm 580 of a bell crank lever. The horizontal arm 582 of the bell crank lever is pivoted to the lower end portion of a trip member or arm 584. The bell crank lever 580, 582 is fulcrumed on a pin 586 mounted in the bracket 562 and a tension spring 588 anchored to the lower extremity of the arm 580 urges the bell crank lever in a counterclockwise direction, as seen in FIG. 17, about the pin 586, such movement being limited by the engagement of the arm 566 with a hub formed on the bell crank lever 580, 582. Downward movement of the striker 572 not only swings the bell crank lever 558, 566 clockwise, as seen in FIG. 17, but also swings the bell crank lever 580, 582 in a clockwise direction, acting through the link 578, the link 578 and the arm 580 acting as an inverted toggle. Downward movement of the roll 570 by the striker 572 continues until the toggle passes through its straightened or dead center position whereupon the spring 588 swings the bell crank lever further in a clockwise direction until the link 578 engages a stop pin 590 fixed in one of the crossbars 82. The spring 588 holds the parts in this position until the plunger 518 (FIG. 16) actuates the Bowden wire 534 as hereinbefore described. As the shoe forms complete their downward movement into their respective mold-closing positions, a set screw 592 carried by an arm 594 of the striker engages an abutment member or arm 596 secured to the arm 78 causing the striker to swing in a clockwise direction about its pivot pin 574 until its lower extremity has disengaged the roll 570. A spring 598 urges the trip member 584 in a counterclockwise direction, as seen in FIG. 17, such movement of the trip member being limited by the engagement of a pin 600 in the upper portion of the trip member with an inclined surface 602 of a bracket 604 secured to the crosshead 44. When the machine is at rest the parts above described occupy their positions in FIG. 17, the surface 602 holding the trip member 584 in a position in which the upper wall of a notch 606 formed in the upper portion of the trip member is just clear of the front end portion 608 of the latch member 430 hereinbefore referred to. It will be remembered that when the valve V1 is shifted by the manual operation of the trip lever 410 to initiate the closing movements of the mold members the latch member 430 swings in a counterclockwise direction, as seen in FIG. 13, to raise the end portion 608. Upon downward movement of the shoe forms, the rods 38 and the crosshead 44, the bracket 604 moves downwardly carrying the surface 602 away from the pin 600, the upper portion of the trip member 584 being then held against counterclockwise movement by the end portion 608 of the latch member 430. As the shoe forms complete their downward movement, the trip member 584 is elevated and the spring 598 swings the trip member in a counterclockwise direction, as seen in FIG. 17, to bring the base of the notch 606 into engagement with the end portion 608 of the latch member. At the end of the timing cycle the spring pressed plunger 518 (FIG. 16) swings the bell crank lever 522 in a counterclockwise direction from its position in FIG. 16 into its position in FIG. 15, thus pulling the cable 534 to the right, as seen in FIG. 15.

Referring to FIG. 18, the cable swings the lever 610 in a counterclockwise direction, as seen in said figure, thus moving the rod 556 to the right. Referring to FIG. 17, the movement of the rod swings the bell crank lever 558 in a counterclockwise direction, as seen in said figure, thus swinging the bell crank lever 580, 582 in a counterclockwise direction to impart downward movement to the trip member 584. Referring to FIG. 13, downward movement of the trip member swings the latch member 430 in a clockwise direction, as seen in said figure, disengaging it from the lever 404 and permitting the spring 406 to swing the lever 404 in a clockwise direction into its position illustrated in FIG. 13. Thereupon, the side mold members move away from each other into their open position. The retraction of the side mold members operates the valve V2, as hereinbefore described, to cause the shoe forms to be elevated into their respective positions illustrated in FIG. 1. As the crosshead 44 moves upwardly the surface 602 (FIG. 17) engages the pin 600 and swings the trip member 584 in a clockwise direction into its position illustrated in FIG. 17 in which it is clear of the end portion 608 of the latch member 430. During the upward movement of the rods 38 with the shoe form mounting assembly the striker 572 is swung in a counterclockwise direction by gravity into its initial position shown in FIG. 17. The parts are thus returned to their respective initial positions ready for the next cycle of operations of the machine.

In the operation of the illustrated machine the operator mounts on each of the shoe forms 30 a lasted shoe upper to which a rubber sole is to be vulcanized. He then places on each of the sole mold members 36 a thin sheet of rubber 37 (FIG. 19) having the general shape of a shoe sole, this sheet being known to the trade as a "skin." He then operates the trip lever 410 (FIG. 1) to cause the side mold members 32 and 34 to move toward each other into their closed position and to cause the bottom mold members to be elevated to provide the bases of mold cavities defining the shapes of the soles or the sole and heel units, as the case may be, to be vulcanized onto the shoe bottoms. The upward movement of each bottom mold member 36 causes the marginal portion of the skin 37 to be gripped between the margin of the upper surface of the bottom mold member and the margins of the bottom surfaces of the side mold members. The operator then places an unvulcanized rubber sole blank and the required filler pieces, if any, in each mold cavity. The operator then swings the shoe forms 30 downwardly into their position illustrated in FIG. 1 by means of the handle 124, as hereinbefore described, and then operates the trip lever 468 to cause the shoe forms, together with the lasted shoe uppers mounted thereon, to move downwardly in unison into positions in which the bottom margin of each upper is firmly seated against the marginal portions of the side mold members thus to seal the mold cavity. It will be remembered that downward movement of the shoe form carrying assembly causes the operation of the timing device which starts the vulcanizing cycle. The bottom mold members, the side mold members and the shoe forms are heated by suitable electrical heating units thermostatically controlled to maintain a temperature therein suitable for the vulcanization of the rubber sole blanks and the molding thereof to the shape defined by the mold cavity. At the end of the vulcanizing period determined by the adjustment of the timing device that device automatically operates the valve V1 to cause the side mold members to move away from each other into their retracted or open position and such movement of the side mold members shifts the valve V3 to cause the shoe forms to be elevated into their position illustrated in FIG. 1. The handle 124 is then operated to swing the shoe forms into their unloading positions whereupon the latch handle 202 (FIG. 3) is operated to unlatch the heel part 176 and to move it downwardly and toewardly relatively to the forepart 174 thus to facilitate the removal of the completed shoe from the form.

Having thus described our invention, what we claim as new and desire to secure by Letters Patent of the United States is:

1. In a sole molding machine, the combination with mold elements, a work support, a carrier for the work support and means for advancing and retracting said mold elements to closed and opened position, respectively, of a pressure fluid operated piston for operating the carrier to advance the work support from a retracted position into a position in which it provides a closure for the mold cavity, a valve for controlling the operation of the piston, means for shifting the valve to initiate the operation of the piston, and means for measuring the duration of a molding cycle comprising a rack member, a continuously reciprocated thrust member for advancing the rack member step-by-step from a predetermined rest position, a biased lever which normally operates to hold the thrust member out of engagement with the rack member, means operated by the advancement of the work support into a mold closing position for retracting the lever so as to release the thrust member for operation on the rack member, a latch for holding the lever against return to its normal position, means for operating the rack member to disengage the latch thereby to release the lever for return movement to its normal position, and means whereby such return movement of the lever initiates opening movement of the mold elements and the return of the work support to its retracted position.

2. In a sole molding machine the combination with a pair of side mold members and a bottom mold member, of a piston for first advancing the side mold members and thereafter advancing the bottom mold member, linkage means coupling said side mold members to said piston, including a spacer member operatively engaged by the piston and through which the piston operates to advance the side mold members, means operating during the advancement of the piston to move the spacer member from operative engagement by said piston into an inoperative position, means including an actuator for said bottom mold member operatively connected to said bottom mold member and said piston whereby the piston advances the bottom mold member, means whereby the piston imparts to said actuator operating movement which continues after the side mold members have been closed, an operating member for completing the advancement of the side mold members into their closed position and for thereafter retaining the side mold members and the bottom mold member against opening movement, and means connecting said actuator to said operating member so that the actuator operates said operating member during the final stage of movement of the piston.

3. In a two station sole molding machine the combination with two bottom mold members, one in each station of the machine, and two pairs of side mold members, each pair including an inner mold member and an outer mold member, there being one such pair in each station of the machine, of link means respectively connecting each inner mold member of a pair of side mold members with the outer mold member of the other pair of mold members for conjoint movement, a piston, linkage means coupling said side mold members to said piston including a spacer member operatively engaged by said piston and through which the piston operates to close both pairs of side mold members, means operating during the advancement of the piston to move the spacer member from operative engagement by said piston into an inoperative position, one actuator common to the two stations of the machine for operating said bottom mold members, means coupling said actuator to the piston whereby the piston imparts to said actuator operating movement which continues after the side mold members have been closed thereby to bring the bottom mold members into operating relation to the side mold members in each station of the machine, operating connections between said actuator and the bottom mold member in each station, means for retaining the side mold members against opening movement during an initial retraction of the bottom mold members, and means operated by said actuator for rendering said retaining means inoperative after such initial retraction of the bottom mold members.

References Cited in the file of this patent

UNITED STATES PATENTS

| | | |
|---|---|---|
| 823,926 | Clark | June 19, 1906 |
| 1,885,337 | Dow | Nov. 1, 1932 |
| 2,168,243 | Rollmann | Aug. 1, 1939 |
| 2,878,523 | Hardy | Mar. 24, 1959 |
| 2,907,068 | Udolek | Oct. 6, 1959 |